Nov. 19, 1929.                M. J. LIDE                1,736,008
                           JIGGING MECHANISM
                    Filed Oct. 26, 1925        3 Sheets-Sheet  1
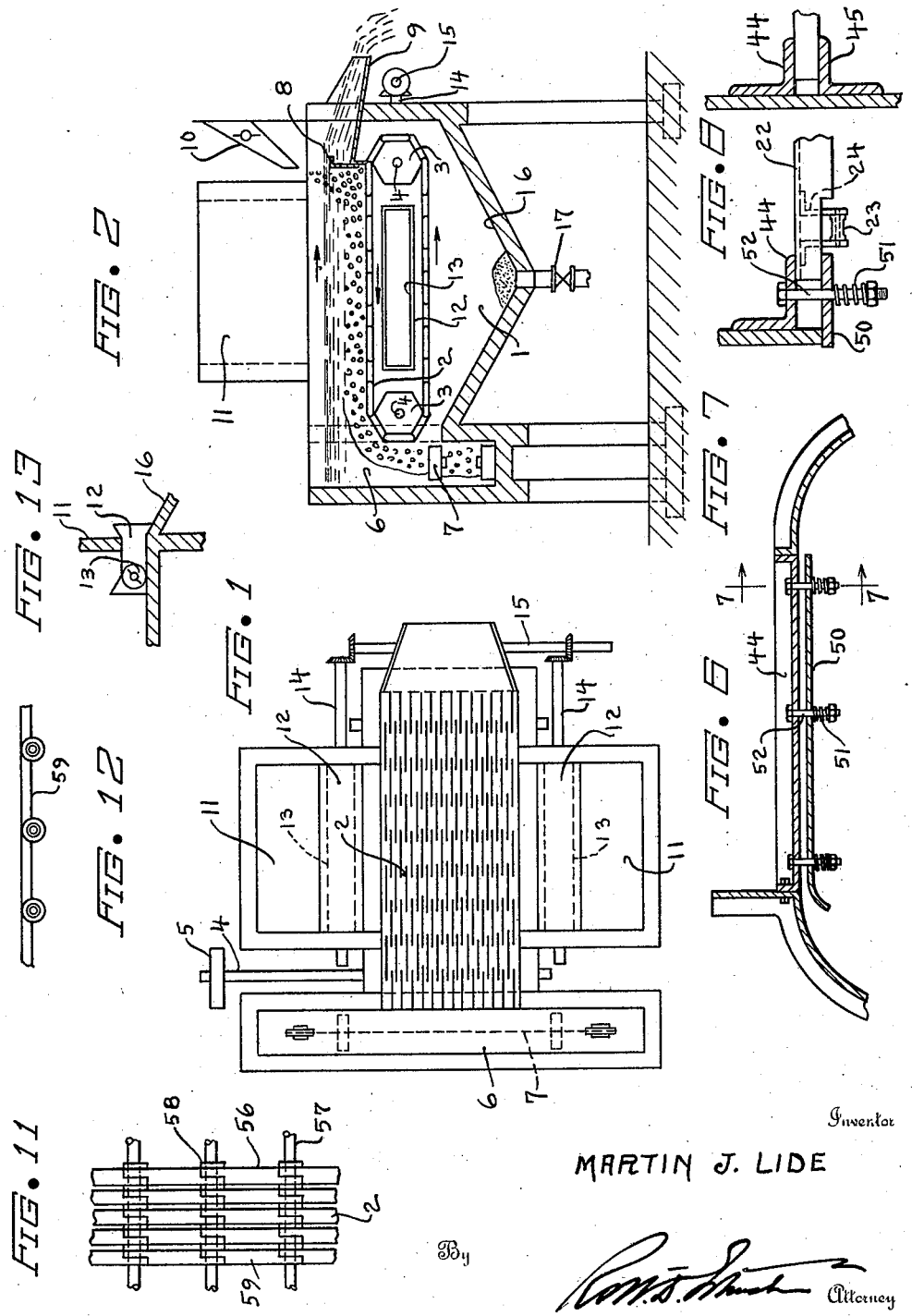
Inventor
MARTIN J. LIDE
By
Attorney

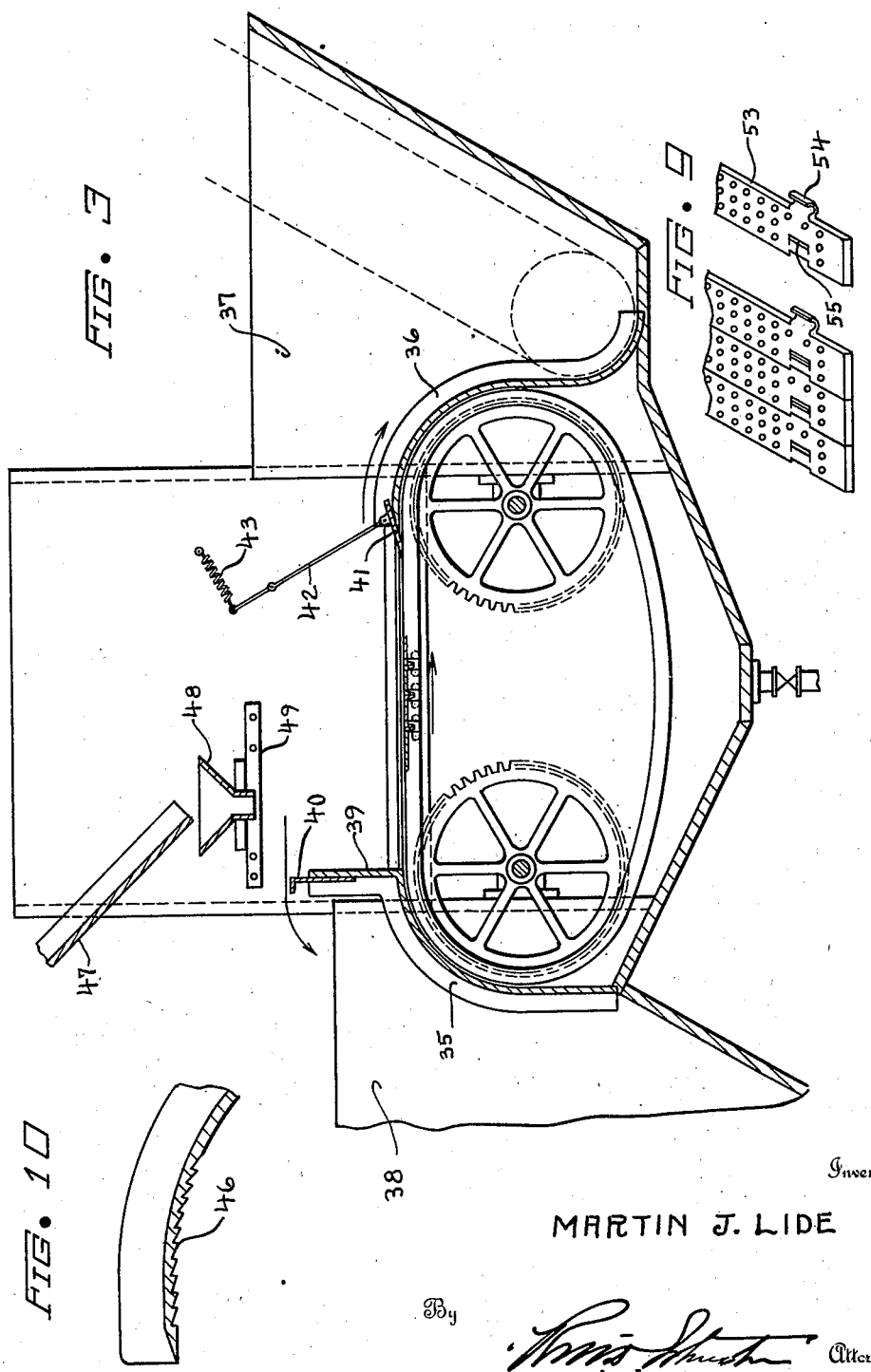

Nov. 19, 1929.  M. J. LIDE  1,736,008
JIGGING MECHANISM
Filed Oct. 26, 1925   3 Sheets-Sheet 3
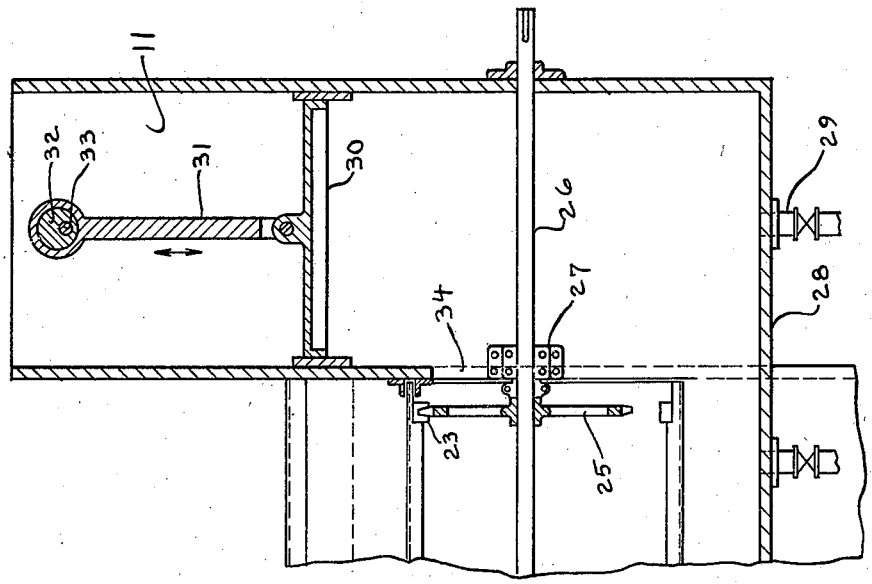
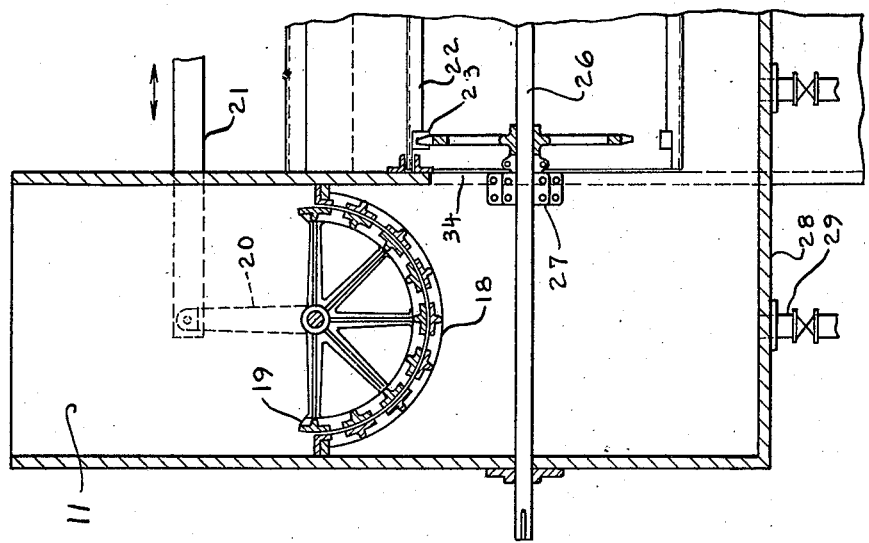
Inventor
MARTIN J. LIDE Patented Nov. 19, 1929

1,736,008

UNITED STATES PATENT OFFICE

MARTIN J. LIDE, OF BIRMINGHAM, ALABAMA

JIGGING MECHANISM

Application filed October 26, 1925. Serial No. 65,010.

My invention relates to a jigging mechanism, and in respect of certain of its features relates to matters shown, but not claimed, in my Patent No. 1,491,870, issued April 29, 1924, wherein is shown a jigging mechanism comprising an endless traveling screen submerged in a jig tank and associated with mechanism for stratifying by water impulses the material on the upper flight of the screen. In said Letters Patent the endless screen is shown traveling both con-currently with and counter-currently to the outflow of water with the fines or lighter material from the jig, and in this application protection is sought for the counter-current flow feature wherein the endless screen is traveling in a direction counter to the outflow of the water bearing the lighter material. The importance of this counterflow arrangement is that the heavier matter is mechanically discharged by the movement of the screen at a point remote from the discharge of the fines or lighter material, and I am enabled to dispense with a discharge gate for the heavier material and the mechanism for operating and adjusting the same, and can discharge very high percentages of heavier material without interfering with the efficient separation of the materials. Moreover, by discharging the heavier material at the opposite end of the moving screen from the discharge for the light material I find it unnecessary to maintain a bed of the heavier material on the screen at the discharge gate which is essential where the discharge of both heavy and light material occurs at the same end of the screen.

My invention contemplates the utilization of any practical means for producing the stratification of material on the screen and this preferably will be by means for producing impulses of water which are uniformly distributed under the upper flight of the endless traveling screen, such impulses being produced either by valve means, controlling the intermittent inflow of water impulses from an adjacent water tank or tanks, or by plungers, and such impulses being admitted either through one or through opposite sides of the jig tank.

My invention further comprises the novel details of construction and arrangements of parts, which in their preferred embodiment only are illustrated in the accompanying drawings, and which are hereinafter more particularly described and claimed.

According to the drawings:—

Fig. 1 is a plan view; and

Fig. 2 a longitudinal cross-section on the line 2—2 of Fig. 1, showing one embodiment of my invention wherein the opposite impulses are admitted to a tank in which the endless screen is formed by a chain.

Fig. 3 is a view corresponding to Fig. 2 showing a modified type of jig with its screen formed by an ordinary perforated flight or pan conveyor and provided with an adjustable feed.

Fig. 4 is a transverse cross-sectional view through a jig mechanism having a single inlet port controlled by an oscillatory multiported valve.

Fig. 5 is a view corresponding to Fig. 4 in which a plunger is provided in the water tank for delivering the water impulses to the jig tank.

Fig. 6 is a detail view of a guide for the upper flight of the traveling screen.

Fig. 7 is a cross-sectional view on the line 7—7 of Fig. 6.

Fig. 8 is a view corresponding to Fig. 7, and illustrating the type of guide shown in Figs. 4 and 5.

Fig. 9 is a detail fragmental view illustrating a screen formed by articulated foraminous plates.

Fig. 10 is an enlarged cross-sectional view of the preferred type of guard overhanging the screen, which is equipped with means to reduce the water flow between it and the screen.

Fig. 11 illustrates a section of a chain screen.

Fig. 12 is a side view of Fig. 11.

Fig. 13 is a detail cross-sectional view illustrating a typical impulse admitting valve.

Similar reference numerals refer to similar parts throughout the drawings.

In the embodiment of my invention illustrated in Figs. 1 and 2, I show a jig tank 1 having an endless traveling screen 2 mounted therein upon polygonal pulleys 3, one of which has its shaft 4 driven by a pulley 5 from any other suitable and convenient source of power so as to cause a continuous travel of the screen at the desired rate of speed, according to the material under treatment. The screen at its left hand end, Fig. 2, overhangs a chamber 6 containing a drag conveyor 7 or the like which is adapted to collect and move to a suitable discharge the heavier material which falls thereonto from the screen. At the opposite end of the tank and above the upper flight of the screen I mount a transverse gate 8 over which the water from the jig tank will overflow with the fines or lighter material and be delivered by means of a chute 9 into any suitable tank. The material to be treated is delivered onto the screen adjacent to the discharge end for the lighter material by means of a feed chute 10.

Alongside of the jig tank, preferably on each side thereof, I arrange two water tanks 11 which have communication with the jig tank through ports 12 disposed below the upper flight of the screen. These ports are elongated to have substantially the effective length of that portion of the upper flight of the screen upon which the separation is taking place. In Fig. 2 I show a rotary valve 13 turning in each port and adapted to admit impulses of water into the jig tank. These valves are driven by shafts 14 which are geared to a common drive shaft 15 so that they rotate in unison and simultaneously admit opposing impulses of water to the jig tank, which impulses are substantially co-extensive with the effective length of the screen. The screen tank has a hopper bottom 16 with a valve controlled discharge 17 for the sludge and sediment collecting therein.

In Fig. 4 the water tank 11 has interposed therein a multiported concave valve seat 18 over which an oscillatory multiported convex valve 19 works, being operated by a crank arm 20 connected to a reciprocable actuator 21. This type of valve mechanism forms the subject matter of my pending application, Serial No. 729,672, filed Aug. 2, 1924 and is not therefore claimed as a part of this invention. The water tank below the valve has full communication with the jig tank 1 through an opening 34 in its side which extends the full width of the water tank and passes to a plane just below the upper flight of the screen. In this view the screen is formed by a flight conveyor composed of perforated channels 22 mounted on conveyor chains 23 by means of ordinary flight attachments 24, (see Fig. 7), and these chains are driven by sprocket wheels 25 fast on shafts 26 mounted in bearings 27 attached to the adjacent side walls of the water tanks. Each shaft at one end projects through the outer wall of either water tank, or of both, where two are used, for connection to a drive means, not shown. In this arrangement both the water and the jig tanks have a continuous hopper bottom 28 provided with any desired number of valved outlets 29.

In Fig. 5 I show the same type of jig and screen construction described in connection with Fig. 4, except that in place of the multiported impulse valve 19 I substitute a plunger 30 driven by a connecting rod 31 from an eccentric 32 on a driven shaft 33. The reciprocation of this plunger will produce impulses of water which flow through the connecting port 34 between the water tank and jig tank, and act on the material on the screen. This port 34 preferably extends the full length of the water tank and of the jig tank, which latter is closed at the lower portion of its ends by guards 35 and 36, preferably formed of bent metal plates flanged at their sides for attachment to the walls of the water tanks and of the discharge tanks 37 and 38 for the separated material. The guard 35 extends with a close clearance about the left hand end of the screen (Fig. 3) to a vertical plane through the centers of the adjacent sprocket wheels and there it is extended vertically at 39 to provide a weir over which the fines or lighter material must flow into the tank 38. An adjustable weir bottom 40 is mounted on the rigid plate 39 and the arrow indicates the overflow over the weir of water with the fines or lighter materials separated on the jig.

The guard 36 at the right hand end of the screen extends from the bottom of the tank 37 with a reverse curve and hugs the discharge end of the screen and extends up over and beyond a vertical central line through its driving sprocket. If desired a scraper blade 41 may be adjustably mounted so as to engage the top surface of the traveling screen immediately in advance of the guard 36. I show this blade mounted on arms 42 pivoted to the sides of the water tanks and engaged by springs 43 which yieldingly hold the scraper blade to its work. The upper flight of the screen is shown traveling between guides 44 and 45 which are formed by angles attached to the sides of the water tanks. In order to reduce to a minimum the tendency of the water impulses to flush up between the screen and guard 36, I prefer to provide the undersurface of the upper portion of the latter with a series of transverse serrations 46 (see Fig. 10), which are disposed like saw teeth and act to retard the afflux of water past the end of the screen. If desired the same arrangement may be used for the guard 35.

I show an adjustable feed for the material to the screen comprising a fixed chute 47 and adjustable hopper 48 slidable on guides 49 on the water tanks and adapted to receive the discharge from the chute 47 so that the latter can be dropped on the screen at the desired distance from the gate 40. In place of the lower rigid screen guide 45, as shown in Fig. 8, I may substitute a yieldable guide 50 supported on springs 51 surrounding bolts 52 depending from the upper guide 44.

As shown in Fig. 9 I may form the screen by perforated plates 53 interlocked by tongues 54 and slots 55 so as to form a transversely articulated screen.

In Figs. 11 and 12 I show in detail a chain screen with the links 56 having shouldered ends interfitted and perforated to receive transverse pipe connections 57 carrying washers 58 to space the links. The intermediate portions 59 of the links 56 of the chain are preferably cut away to reduce weight, as will be seen in Fig. 12, or in any other suitable way, but the ends of the links 56 are made thicker than the intermediate portions to give greater bearing surface on the guides.

It is to be understood that water is to be supplied to the water tanks by any suitable mechanism, not shown, which will maintain such difference in elevation between the water tank or tanks and the jig tank as will produce impulses of the desired intensity when the valve or valves are opened and the valves being continuously operated these impulses will be periodically delivered into the jig tank and will be substantially co-extensive with the effective length of the screen, thus causing them to be substantially uniformly distributed so as to produce the most effective separation of the material on the screen, all as described more in detail in my Letters Patent aforesaid. The same action will be obtained by the operation of the plunger or plungers 30. While the stratification or separation is proceeding in the manner desired on the screen, the latter is being driven in the direction which will cause its upper flight to move counter to the direction of flow of the water from the jig tank over the gate 40. The heavier material is thus discharged continuously at the right (Fig. 3) while the fines or lighter material that is separated by the water impulses from the heavier material, is being continuously discharged with the overflow water at the left, thus giving all the advantages hereinbefore more fully pointed out.

Though I have described with great particularity the details of the embodiment of the invention herein shown, it is not to be construed that I am limited thereto, as changes in arrangement and substitution of equivalents may be made by those skilled in the art without departing from the invention as defined in the appended claims, wherein I have sought to protect broadly the idea of mechanically discharging the heavy material by moving it in a direction counter to that of the lighter matter which is carried off with the overflow water.

Having thus described my invention, what I claim as new and desire to secure by Letters Patent, is:

1. A counter-current jig, comprising a jig tank having an endless traveling screen mounted therein, means for feeding material to be treated on to one end of the screen, a wier for the overflow of the lighter stratified material disposed at said end of the screen, and a discharge chute for the heavier stratified material at the other end of the screen, said chute having a bottom wall closely overhanging the discharge end of the screen for guarding said screen.

2. A counter-current jig comprising a jig tank having an endless traveling screen mounted therein, a wier for the overflow of the lighter stratified material disposed at one end of the screen, and an overflow tank beyond the wier separated from the jig tank by a partition curved to conform to and overhang the adjacent end of the screen, said partition terminating at the base of the wier.

3. A counter-current jig, comprising a jig tank having an endless traveling screen mounted therein, there being at one end of the screen an overflow wier, means to move the screen's upper flight away from the said wier, means to feed the material to be treated onto said screen adjacent to the wier, a curved end wall in the tank which is curved to conform to the discharge end of the screen and disposed to overhang same closely and form a discharge chute for the heavier stratified material, and means to deliver water impulses to the jig tank below the upper flight of the screen.

4. A jig tank according to claim 3, in which said wall forming a discharge chute is provided on its under face adjacent to the screen with means to check the flow of water between said wall and screen.

5. A counter-current jig, comprising a jig tank having an endless traveling screen mounted therein, curved end walls overhanging the two ends of the screen and closely juxtaposed thereto forming screen guards, and means to deliver water impulses below the upper flight of the screen, said means comprising a water tank and communicating means between the water tank and the jig tank and extending substantially the distance between the curved end walls.

6. In combination a water tank, a valve controlled port extending the length of the tank, a jig tank into which said port opens, an endless screen in said tank end walls for the tank which closely overhang the screen ends and snugly confine said screen within a chamber open only overhead through the upper screen flight, said port opening into said chamber between the screen flights and extending substantially the length of the exposed portion of the upper screen flight, a wier at one end of the tank, means to move the screen to discharge the heavy stratified material thereon over the other end wall of said chamber, and means to feed material to the screen adjacent to the wier.

7. In a pulsating jig, a jig tank, an endless traveling screen flight submerged therein, guide means to support in position the said flight, end walls for the tank overhanging the screen in closely spaced relation thereto and which co-act with the side walls and the ends of the screen flight to define a separating chamber, means to force pulsations of water up through said screen flight, and means to separately discharge the materials of different specific gravity stratified by said screen in said chamber.

8. In a pulsating jig, a jig tank, an endless traveling screen flight submerged therein, yieldable guide means to support in position the said flight, end walls for the tank which co-act with the side walls and the ends of the screen flight to define a separating chamber, means to force pulsations of water up through said screen flight, and means to separately discharge the materials of different specific gravity stratified by said screen in said chamber.

In testimony whereof I affix my signature.

MARTIN J. LIDE.